United States Patent
Martin et al.

(10) Patent No.: US 6,324,160 B1
(45) Date of Patent: *Nov. 27, 2001

(54) ADAPTIVE RECEIVER FOR CDMA BASE STATIONS

(75) Inventors: Utz Martin, Bensheim; Thomas Frey, Ulm, both of (DE)

(73) Assignee: Deutsche Telekom AG, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,341

(22) Filed: Sep. 23, 1998

(30) Foreign Application Priority Data

Sep. 23, 1997 (DE) .............................. 197 41 872

(51) Int. Cl.[7] .................................. H04B 7/216
(52) U.S. Cl. ..................... 370/209; 370/335; 370/334; 370/342; 375/349
(58) Field of Search ................................. 370/208, 209, 370/335, 334, 342, 441; 375/148, 147, 267, 340, 346, 347, 349

(56) References Cited

U.S. PATENT DOCUMENTS

| 5,218,619 | 6/1993 | Dent . |
| 5,563,610 | 10/1996 | Reudink . |
| 5,652,765 | 7/1997 | Adachi et al. . |
| 5,905,721 | * 5/1999 | Liu et al. ............................ 370/342 |
| 6,067,292 | * 5/2000 | Huang et al. ....................... 370/342 |
| 6,078,573 | * 6/2000 | Batalama et al. .................... 370/335 |

FOREIGN PATENT DOCUMENTS 44 41 543   5/1995 (DE) .
0 756 391   1/1997 (EP) .

OTHER PUBLICATIONS

Ayman F. Naguib et al., "Performance of Wireless CDMA with M –ary Orthogonal Modulation and Cell Site Antenna Arrays," IEEE Journal on Selected Areas in Communications. Vol. 14 No.9, Dec. 1996 pp. 1770–1783.

* cited by examiner

Primary Examiner—Ricky Ngo
(74) Attorney, Agent, or Firm—Kenyon & Kenyon

(57) ABSTRACT

An adaptive receiver for base stations of CDMA mobile wireless systems corresponding to the IS-95 Standard. The receiver is designed as an incoherent rake receiver and includes an antenna array. The receiver is capable of analyzing a plurality of components of the same signal transmitted by a mobile station arriving at the antenna array via different propagation paths and from different directions with a time offset. To form virtual antenna directivity patterns for individual rake processing paths, which are adjusted to the directions of incidence of the signal paths to be analyzed, direction signature vectors are calculated and made available to the processing paths together with a signal propagation time that is required for synchronizing the signal components. The direction signature vectors are calculated iteratively from the antenna correlation matrices formed recursively for all possible signal delay times from pulse responses of the antenna arrays. The signal components associated with the processing paths are selected according to the average path powers determined for the individual signal delay times, and the path powers are also calculated from the antenna correlation matrices.

6 Claims, 1 Drawing Sheet

ADAPTIVE RECEIVER FOR CDMA BASE STATIONS

FIELD OF THE INVENTION

The present invention concerns an adaptive receiver for base stations of CDMA mobile wireless systems.

RELATED TECHNOLOGY

Rake receivers are used to ensure optimum reception at base stations in the uplink of CDMA mobile wireless systems corresponding to the IS-95 Standard and thus to contribute to the ability of a base station to service a maximum possible area and/or a maximum number of subscribers. In particular, in urban areas, for example, there is often no visual contact between the transmitting mobile station and the base station and only reflected components of the emitted signals are received. Rake receivers make it possible to process transmitted signal components, received from generally different directions and with a time offset at the receiver's antenna array, individually and subsequently recombine them to evaluate the information received.

Such a receiver is described, for example, in A. F. Naguib and A. Paulraj, "Performance of Wireless CDMA with M-ary Orthogonal Modulation and Cell Site Antenna Arrays," IEEE Journal on Selected Areas in Communications, Vol. 14, No. 9, December 1996, pp. 1770–1783. In order to estimate the control parameters (channel vectors, weight vectors) for the individual rake processing paths, which take the angles of incidence of the signal components into account, the receiver requires the antenna correlation matrices calculated from the HF-demodulated reception signals of the antenna elements before and after despreading, as described on p. 1773, left column of the article. In particular, the computation of correlation matrices from signals which have not yet been despread requires substantial amounts of time and computing capacity due to the large amount of information to be processed. In addition, with the known circuit it is not clear whether the sturdiness to ensure the consistent reception quality required for such systems is guaranteed when erroneously restituted individual Walsh symbols result in an incorrect selection of the despread reception signals for computing the required correlation matrices.

SUMMARY OF THE INVENTION

An object of the present invention is to provide an adaptive receiver for antenna arrays in CDMA base stations of mobile wireless systems designed according to the IS-95 Standard having a highly effective adaptively controllable antenna directivity capable of amplifying the useful portion of several components of the same signal received on different signal paths and, in general, with a time offset, and capable of considerably weakening noise signals, which also exhibits sufficient sturdiness against erroneous decisions when demodulating individual Walsh symbols, and which can be implemented at the lowest possible cost.

The present invention provides a receiver for a base stations in CDMA mobile wireless systems operated according to the IS-95 Standard, comprising an antenna array (10) having a plurality of antenna elements (11 through 18) and I/Q demodulators connected downstream from the antenna elements, and a demodulator module (2) having a plurality of processing paths (21a through 24a; 21d through 24d), in which components of individual signals transmitted from mobile stations and arriving at the antenna array via different signal paths can be processed independently of one another prior to being combined in a downstream incoherent rake combiner (25, 26), at whose output restituted Walsh symbols containing useful signals can be picked up for further processing. Each of the individual processing paths forms reception channels optimally set in space and time to the most important signal paths, changes in these signal paths being tracked by the fact that a complex vector combination of the I/Q-demodulated in-phase and quadrature signals (x(i)) with direction signature vectors ($\hat{a}_\mu$) estimated for individual signal paths to be analyzed is performed in the individual processing paths. A circuit arrangement (3) is provided for estimating the required direction signature vectors using antenna correlation matrices ($R_{zz,\mu}(k)$) obtained from a plurality of consecutive possible signal propagation times, characterized in that in order to estimate the direction signature vectors, the circuit arrangement (3) correlates the I/Q-demodulated signals (x(i)) received by the antenna elements with transmission signals recovered from restituted Walsh symbols by remodulation at consecutive points in time that mark possible signal propagation times to obtain pulse response vectors of the antenna array. The circuit contains a correlator (32) and a remodulator (33) for this purpose, a circuit (34) for recursively forming antenna correlation matrices from the coefficients ($z_\mu(k)$) of the pulse response vectors being connected downstream from the correlator, the estimation accuracy and the rate of change being set via the selection of an averaging parameter ($\eta$). The direction signature vectors ($\hat{a}_\mu$) are calculated in additional circuits (35, 36, 37) from the antenna correlation matrices by iteration, and the average path powers ($p_\mu(k)$) and the component propagation times ($\tau_\mu$) for the signal paths producing the strongest path powers are determined by calculating the trace of the antenna correlation matrices. The estimated direction signature vector together with the component propagation time relevant for the respective signal path are made available on the processing paths set to the respective signal paths for a predefined number of signal paths producing the strongest signal powers.

The receiver according to the present invention needs no complex computations of antenna correlation matrices from not yet despread reception signals.

BRIEF DESCRIPTION OF THE DRAWING

The present invention is elucidated below with reference to the drawing in which.

DETAILED DESCRIPTION

Figure 1:
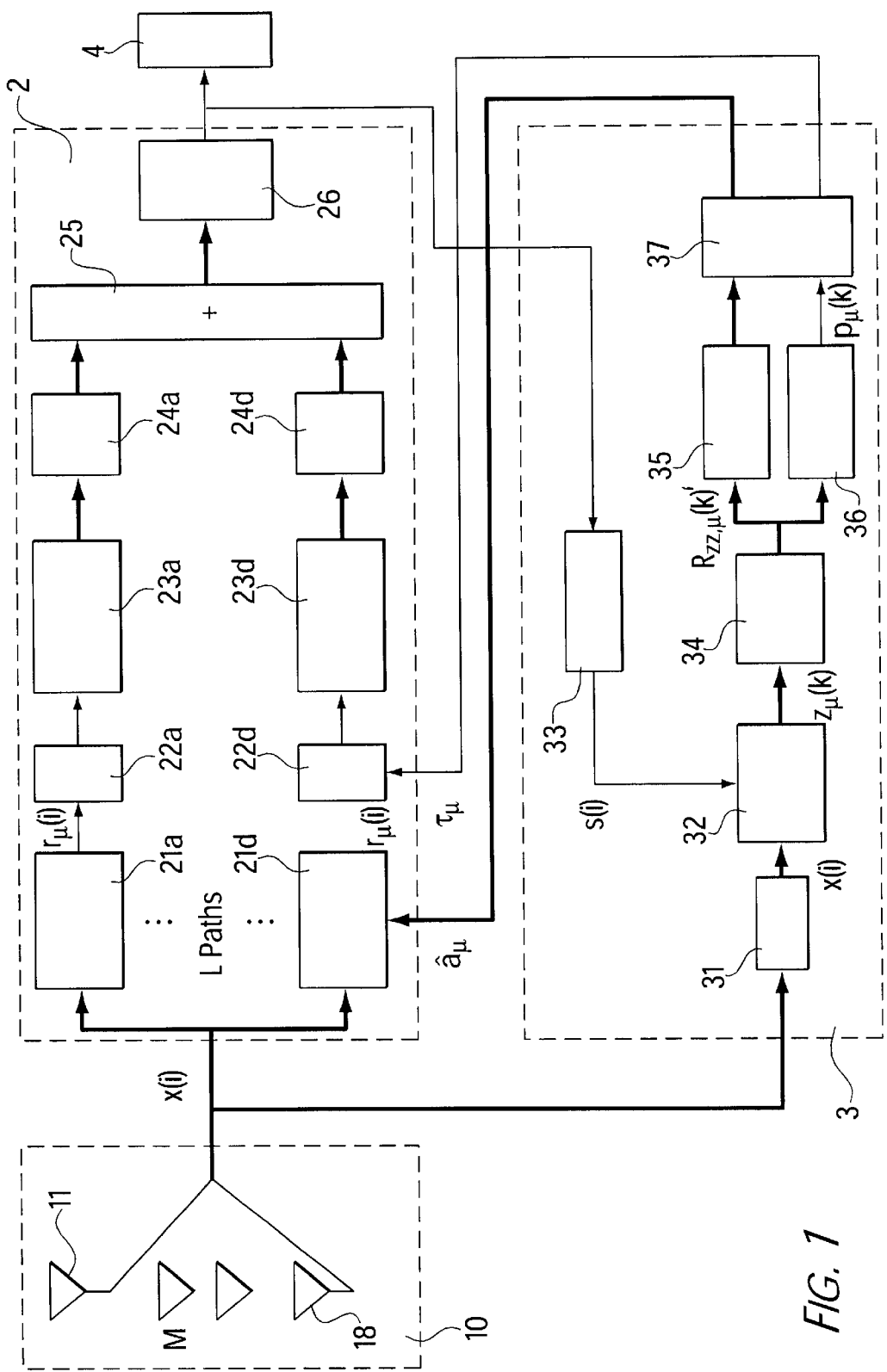
FIG. 1 shows a block diagram of a receiver according to the present invention.

Referring to FIG. 1, a demodulator module 2 and a circuit for direction signature and propagation time estimation 3 are connected in parallel downstream from an antenna array 10.

The antenna array contains, for example, M=8 antenna elements 11 through 18, spaced at one-half carrier wavelength from one another along a horizontal base and thus meets the condition of the spatial sampling theorem. I/Q demodulators (not shown in the figure) are connected downstream from the individual antenna elements, which demodulate the antenna signals into the base band and supply the downstream components with appropriate in-phase and quadrature signals x(i).

Demodulator 2, which is basically formed by a computer with suitable signal inputs and outputs, operates as an incoherent rake receiver and has, for example, L=4 processing paths, in which the four strongest received multipath components of the signals to be evaluated are processed independently of one another. The signals to be processed are despread in independent correlator banks 23a through 23d and subjected to an FHT (Fast Hadamard) transform, with all the potential Walsh symbols being detected. The potential Walsh symbols are subsequently restituted through squaring in circuits 24a through 24d and subsequent addition and maximum value searching in circuits 25 and 26, which are common to all processing paths. The restituted Walsh symbols are sent to a subsequent analyzer circuit 4, which is not described in detail, according to the specifications of the IS-95 Standard.

A vector multiplication of the individual complex I/Q-demodulated antenna signal by the spatial filter parameters, which show preference for a certain direction of incidence and suppress other directions to the maximum possible extent, is performed in all processing paths in vector combinators 21a through 21d, arranged here at the inputs of the demodulator processing paths, to obtain antenna directivity patterns. Conjugated complex values of the elements of a direction signature vector $\hat{a}_\mu$, obtained by estimation at regular time intervals, for example, are used as spatial filter parameters. In a delay circuit 22a through 22d, prior to input in the downstream correlator bank, the scalar complex output signal $r_\mu(i)$ of each vector combinator obtained after the addition of the I/Q demodulated antenna signals, weighted by their direction of incidence, is delayed by a signal propagation time $\tau_\mu$ that is characteristic for the signal path to be detected by the respective processing path. The value of the signal propagation time is such that the signal components incoming over the signal paths detected at different points in time are synchronized. The characteristic signal propagation times $\tau_\mu$ and direction signature vectors $\hat{a}_\mu$ are made available for the individual signal paths to be analyzed by the direction signature and propagation time estimator circuit 3.

Direction signature and propagation time circuit 3 is responsible for determining the direction signature vector $\hat{a}_\mu$ and the corresponding characteristic propagation time $\tau_\mu$ for each signal path to be detected by a processing path, and for adjusting these parameters according to the changing conditions of the CDMA wireless interface system for the existing link. Thus, the channel characteristics of the antenna array for, for example, the L=4 strongest components detected must be determined consecutively in short time intervals and it must be ensured that these signal components are in fact the highest-powered signal components. Should a signal component become weakened and another be received with a higher power due to a change in the location of the mobile transmitter, the signal component with the higher power must be analyzed and assigned to a processing path for this purpose, rather than the previously detected signal component.

Direction signature and propagation time circuit 3 performs correlative estimation in a correlator 32 of the complex pulse responses for all M antenna elements 11 through 18 of antenna array 10. For this purpose, the I/Q-demodulated reception signals x(i) of all M antenna elements are correlated, after insertion of a time delay in a time element 31 upstream from the correlator, with signals s(i) obtained from the restituted Walsh symbols. Signals s(i), which correspond to the signals transmitted by the mobile station, appear at the output of demodulator 2, and are remodulated in a Walsh modulator 33 before correlation. Time element 31 is designed so that the time delay corresponds to the processing time needed for demodulation, restitution and remodulation of Walsh symbols and thus compensates for the time offset caused by reconstruction of the transmission signals. The correlation is done with little effort using fast convolution with FFT algorithms in the frequency range and yields pulse response vectors, whose coefficients $z_\mu(k)$ represent the pure pulse responses—freed of the information transmitted—of the antenna elements for a predefined number of consecutive possible signal propagation times $\mu$. The correlation length is selected, for example, according to the duration of a power control group according to the IS-95 Standard as 1.25 ms.

From the coefficients of the pulse response vectors, antenna correlation matrices $R_{zz,\mu}$ can be recursively constructed in a subsequent circuit 34, for example, in a suitably programmed computer, for all signal propagation times $\mu$; the matrix elements have the form $$R_{zz,\mu}(k) = (1-\eta)R_{zz,\mu}(k-1) + \eta z_\mu(k) z_\mu^H(k)$$

Indices $\mu$ describe dependence on the propagation time, k symbolizes the time axis measured in correlation blocks of, e.g., 1.25 ms. $\eta$ represents an averaging parameter through which the estimation accuracy and the rate of change can be set. Selecting $\eta=0.1$ guarantees sufficient suppression of erroneous information feedback (erroneously restituted Walsh symbols) if the rate of change is sufficiently high.

The direction signature vectors $\hat{a}_\mu$ are computed from the antenna correlation matrices in parallel circuits 35 and 36, which can be implemented as programs of a computer, and the mean reception powers (path powers) are determined for selection of the L most important, i.e., most powerful signal paths. The direction signature vectors can be computed in a known manner by iteration according to $$\hat{a}_\mu(k) = c(k) R_{zz,\mu}(k) \hat{a}_\mu(k-1)$$

where c(k) is used for normalizing the length of vector $\hat{a}_\mu(k)$ to a fixed value, e.g., =1. The path powers $p_\mu(k)$ are obtained from the trace, i.e., the sum of the elements of the main diagonal of the respective antenna correlation matrices:

$$p_\mu(k) = 1/M \text{ trace}\{R_{zz,\mu}(k)\},$$

where M is the number of antenna elements. In a selector circuit 37, the four strongest signal components are then determined using the calculated path powers, and the respective signal propagation times $\tau_\mu$ and direction signature vectors $\hat{a}_\mu$ are output to the demodulator 2.

What is claimed is:

1. A receiver for a base station in a CDMA mobile wireless system operated according to the IS-95 Standard comprising:

an antenna array including a plurality of antenna elements and I/Q demodulators connected downstream from the antenna elements, the I/Q demodulators for producing I/Q demodulated signals including in-phase and quadrature signals;

a demodulator module including:

an incoherent rake combiner;

a plurality of processing paths capable of processing components of individual signals independently of one another prior to the signals being combined in the incoherent rake combiner, the signals being transmitted from mobile stations and arriving at the antenna array via different signal paths, each of the individual processing paths forming reception channels optimally set in space and time to a predefined number of signal paths producing the strongest signal powers, changes in the signal paths producing the strongest signal powers being tracked through performance, in the individual processing paths, of a complex vector combination of the I/Q-demodulated signals with direction signature vectors estimated for the signal paths producing the strongest signal powers;

an output where restituted Walsh symbols containing useful signals are available for further processing; and a circuit arrangement for estimating the direction signature vectors using antenna correlation matrices obtained from a plurality of consecutive possible signal propagation times, the circuit arrangement including:

a correlator and a remodulator for estimating the direction signature vectors by correlating the I/Q-demodulated signals with transmission signals recovered from restituted Walsh symbols by remodulation at consecutive points in time that mark possible signal propagation times to obtain pulse response vectors of the antenna array;

a first circuit for recursively forming antenna correlation matrices from coefficients of the pulse response vectors connected downstream from the correlator, an estimation accuracy and a rate of change being set through selection of an averaging parameter, a plurality of second circuits for calculating the direction signature vectors from the antenna correlation matrices by iteration, and for determining average path powers and component propagation times for the signal paths producing the strongest signal powers by calculating the trace of the antenna correlation matrices;

wherein the estimated direction signature vectors and the component propagation times for a respective signal path are made available on the respective corresponding processing paths.

2. The receiver as recited in claim 1 further comprising a delay circuit connected upstream from the correlator and having a delay time so as to approximately correspond to a processing time needed for demodulation, restitution and remodulation of the Walsh symbols.

3. The receiver as recited in claim 1 wherein the I/Q-demodulated signals are correlated with the restituted Walsh symbols after remodulation, using fast convolution or fast Fourier algorithms.

4. The receiver as recited in claim 3 wherein a correlation length of 1.25 ms is selected.

5. The receiver as recited in claim 1 wherein an averaging parameter of approximately $\eta=0.1$ is used in the recursive formation of the antenna correlation matrices from the coefficients of the pulse response vectors.

6. A circuit for a receiver for a base station in a CDMA mobile wireless system operated according to the IS-95 Standard, the circuit comprising:

a correlator and a remodulator for correlating I/Q-demodulated signals with remodulated transmission signals to obtain pulse response vectors of an antenna array, the remodulated transmission signals being recovered from restituted Walsh symbols by remodulation at consecutive points in time that mark possible signal propagation times;

a first sub-circuit for recursively forming antenna correlation matrices from coefficients of the pulse response vectors connected downstream from the correlator, an estimation accuracy and a rate of change being set through selection of an averaging parameter; and at least one second sub-circuit for calculating direction signature vectors from the antenna correlation matrices by iteration, and for determining average path powers and component propagation times for respective signal paths producing the strongest signal powers.

* * * * *